Sept. 1, 1953 G. G. GOODWYN 2,650,728
AUTOMOBILE STORAGE APPARATUS
Filed Jan. 26, 1950 4 Sheets-Sheet 2

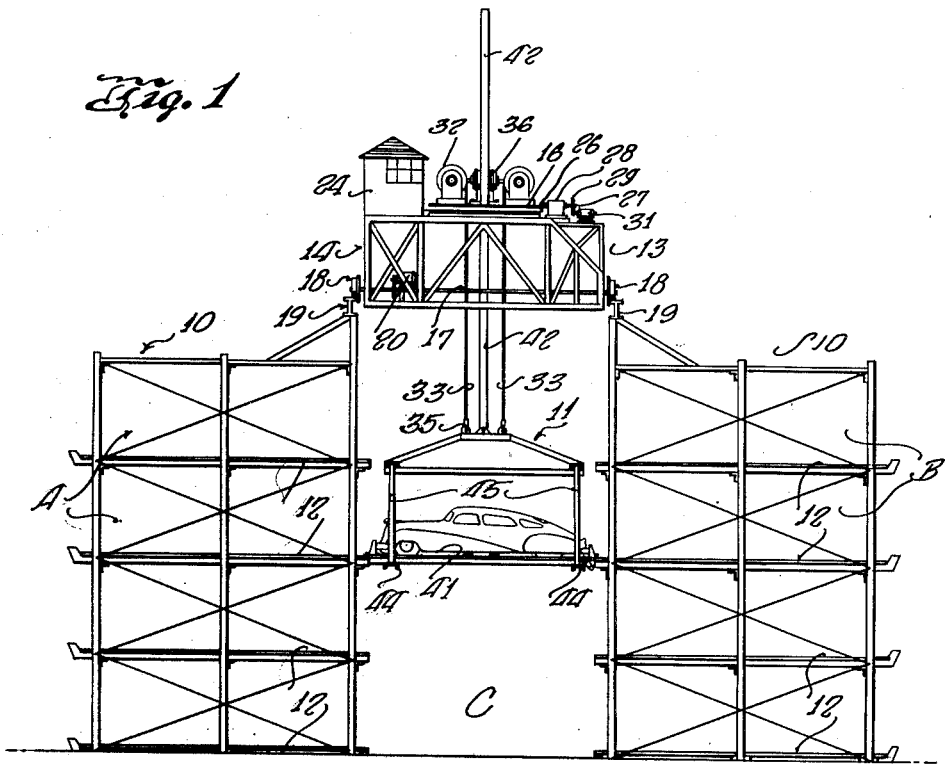
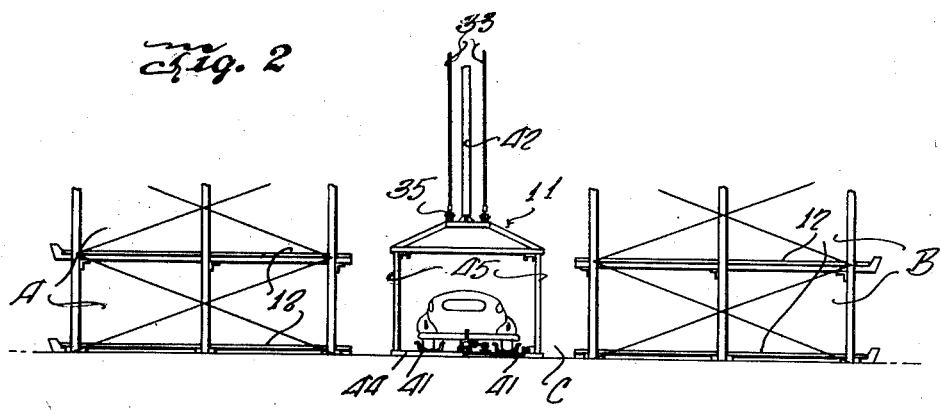

George G. Goodwyn
INVENTOR.

BY
ATTORNEY

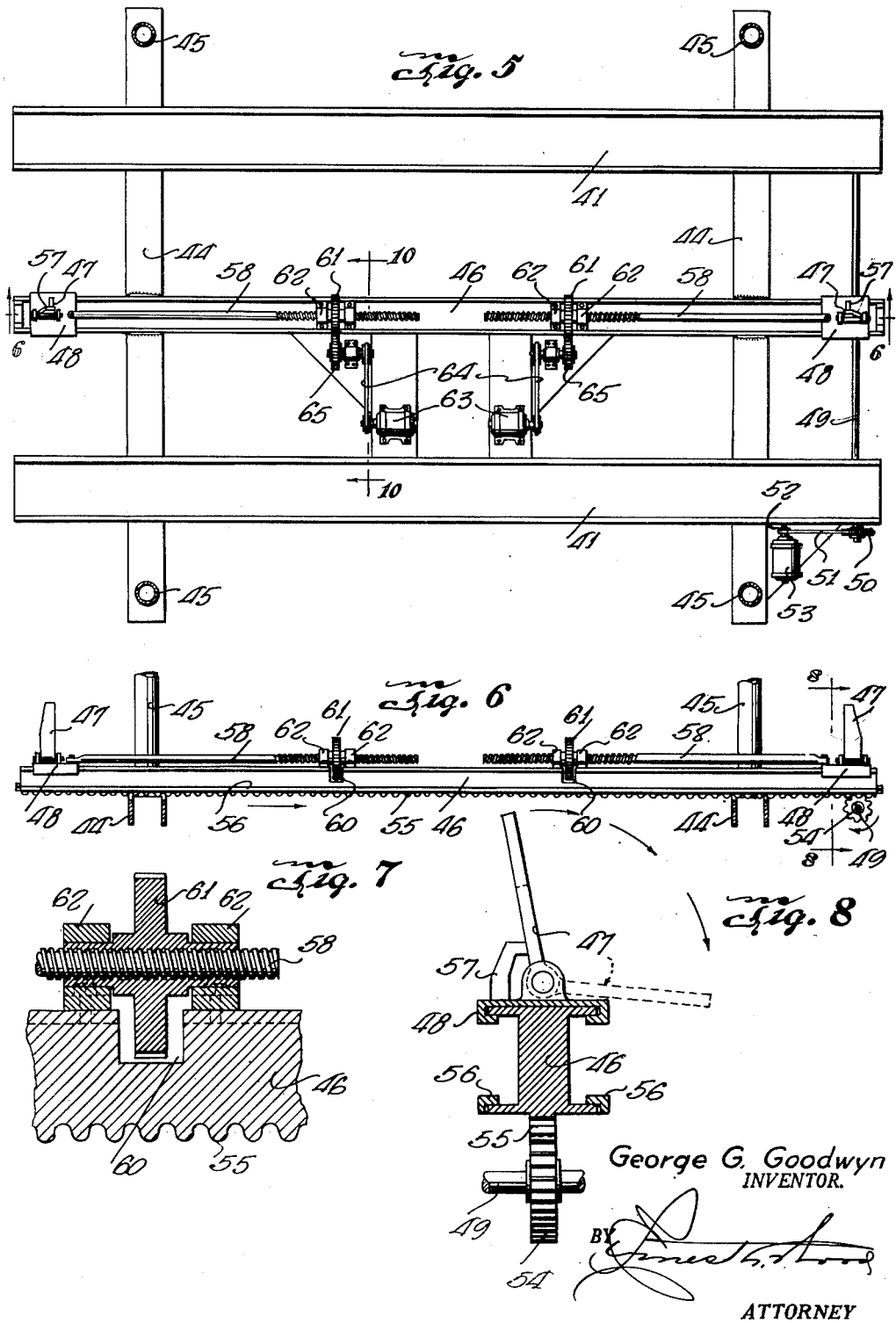

Sept. 1, 1953 G. G. GOODWYN 2,650,728
AUTOMOBILE STORAGE APPARATUS
Filed Jan. 26, 1950 4 Sheets-Sheet 4

George G. Goodwyn
INVENTOR.

ATTORNEY

Patented Sept. 1, 1953

2,650,728

UNITED STATES PATENT OFFICE 2,650,728

AUTOMOBILE STORAGE APPARATUS

George G. Goodwyn, Dallas, Tex.

Application January 26, 1950, Serial No. 140,653

4 Claims. (Cl. 214—95)

This invention relates to automobile storage apparatus and more particularly to a parking and storage system which includes vertically and horizontally arranged storage stalls and a means for maneuvering vehicles into and out of the stalls.

The principal object of the invention is to simplify hitherto complex and expensive systems for parking automobiles in limited areas through the provision of a novel form of elevator which is suspended for vertical and rotative displacement in relation to superimposed and longitudinally arranged stalls by means of a tower spanning the alley between opposing tiers of stalls and adapted to travel on rails supported above the confronting faces of the stalls. Moreover, the invention provides that vehicles may be safely maneuvered into and out of the stalls with but a minimum of labor.

Another object of the invention is to provide an elevator or cradle equipped with means, controllable from the tower, for transferring an automobile from the cradle to a selected stall when the cradle is brought into register with the floor thereof, said means being likewise effective to prohibit undue displacement of the vehicle with respect to the cradle while the latter is in motion.

Other objects will appear as the description proceeds, taken in connection with the accompanying drawing, wherein:

Figure 1 is an end elevational view of the parking stall assembly showing the super-structure and cradle, the latter positioned to receive or discharge a vehicle with respect to a selected stall.

Figure 2 is a fragmentary view of Figure 1, showing the cradle rotated ninety (90) degrees from its position in Figure 1.

Figure 5 is a transverse sectional view of the cradle or elevator, showing the vehicle tracks and propelling means.

Figure 6 is a longitudinal sectional view taken on line 6—6 of Figure 5.

Figure 7 is a fragmentary sectional view of the transfer rack and extension shafts of the cradle, constituting the vehicle propelling means.

Figure 8 is a vertical sectional view of the transfer rack, taken on line 8—8 of Figure 6.

Figure 9 is a fragmentary perspective view of the cradle, showing the tracks and disclosing the transfer rack in extended position.

Figure 10 is a sectional view taken on line 10—10 of Figure 5, and

Figure 11 is a fragmentary elevational view of the transfer rack on a slightly larger scale, showing one of the stop brackets.

Figure 3:
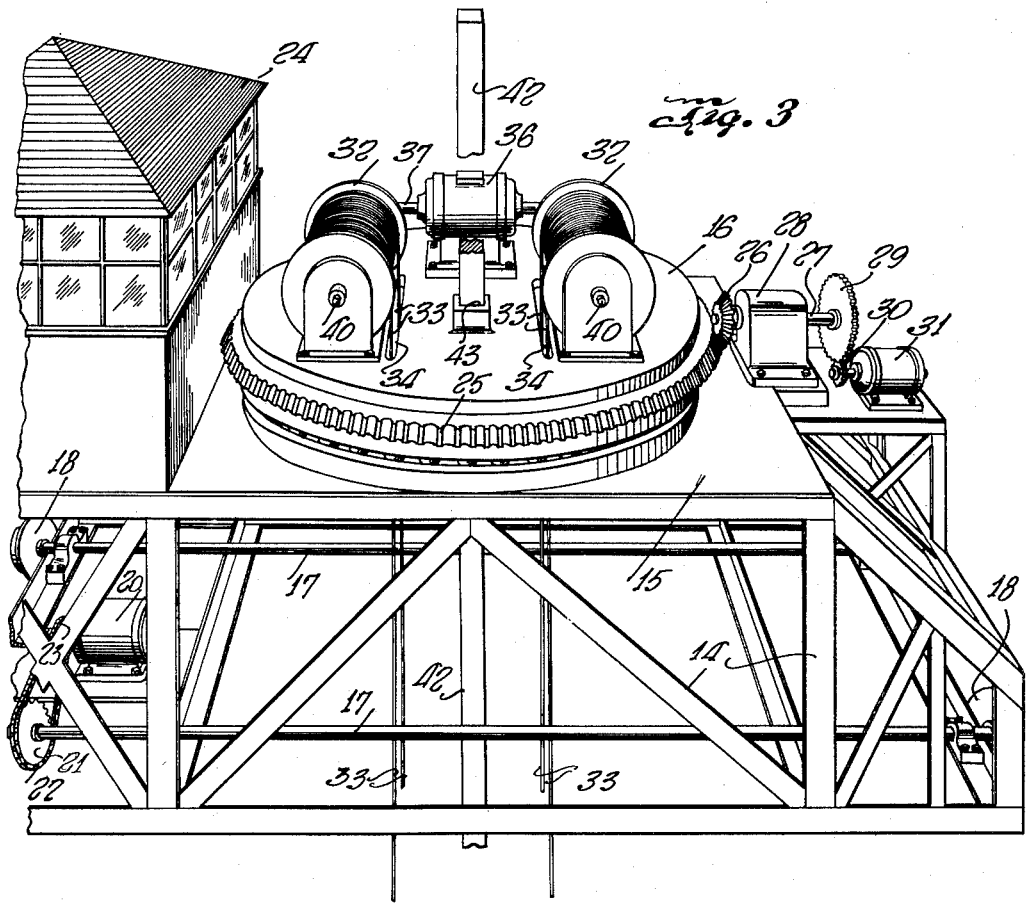
Figure 3 is a fragmentary perspective view of the superstructure.

Continuing with a more detailed description of the drawing, reference is primarily made to Figures 1 and 2 wherein numeral 10 denotes generally the steel fabrication of a plurality of vertically and horizontally spaced stalls A and B, separated in tiers to define an intervening alleyway C, in which operates an elevator, generally designated at 11. Each stall has a pair of longitudinally arranged and flanged tracks 12, with the ends of which the ends of similar tracks of the elevator 11 are brought into register when it is desired to park an automobile in a stall or to remove one therefrom, in a manner to be presently described.

The elevator 11 is constructed with such dimensions that it may freely turn in the width of the alley C from a longitudinal position therein to a transverse position, as revealed in Figures 1 and 2 for loading and unloading automobiles at the floor level or at any desired level with respect to the stalls A and B.

To support the elevator 11 for vertical and rotative movement, a superstructure, generally indicated at 13, is provided, the same consisting of a frame 14, supporting a platform 15 on which is mounted a turntable 16. Extending longitudinally of the frame are spaced apart shafts 17 (Fig. 3), each carrying on its outer end a flanged wheel 18, the wheels being adapted to operate on rails 19 (Fig. 1), supported on the vertical framework of the confronting stalls A and B. The superstructure or carriage, as it will be hereinafter referred to, is adapted to travel from one end of the alley C to the other and is propelled by an electric motor 20 (Fig. 3) which drives one of the shafts 17 through a chain 22 passing over a sprocket 21 on the shaft 17 and a like sprocket 23 on the motor shaft. Suitable controls (not shown) for the motor 20 and other motors to be later mentioned, are accessible to the operator stationed in a tower 24 (Fig. 3) supported on the platform 15 of the carriage.

The turntable 16 has an annular gear flange 25 about its perimeter, engaged by a pinion 26, the latter being mounted on a shaft 27 journaled in a bearing 28 adjacent the turntable. A gear 29 is mounted on the opposite end of shaft 27 and is engaged and driven by a smaller gear 30, carried by the shaft of a motor 31.

Figure 4:
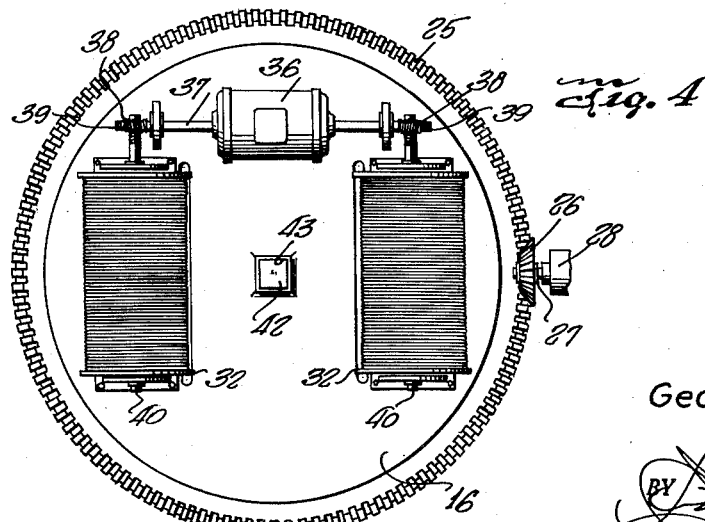
Figure 4 is a top plan view of the turntable per se.

Mounted in parallel relationship on the turntable 16 is a pair of cable drums 32. Each drum has wound thereon a pair of cables 33 which depend through elongated slots 34 in the turntable and are connected to the top of the elevator at 35 (Figs. 1 and 2). A motor 36, mounted on the turntable 16 operates a shaft 37 having, on each end, a worm 38 (Fig. 4). The worms 38 engage worm gears 39 carried on the ends of the shafts 40 of the cable drums 32 to operate the same. As stated, controls, including those for the motor 36, are installed in the tower 24.

As the elevator 11 is maneuvered in the alleyway C and especially when it is swung from a longitudinal to a transverse position therein or vice versa, there may be a tendency to oscillate and prevent ready alignment of the tracks 41 of the elevator cradle with the tracks 12 of a selected stall. To prevent such oscillation, a column 42 of substantially square cross-section is attached rigidly to the top of the elevator and extends upwardly through a square opening 43 in the center of the turntable 16. The fairly wide spacing between the four supporting cables 33 may be sufficient to hold the elevator against oscillation but the column 42 is provided as an added precaution and to obviate the need for an attendant in aligning the tracks of the cradle with those of the stalls.

Referring now specifically to the elevator cradle, it will be observed in Figures 5 to 11 inclusive that cross-members 44 support the tracks 41 adjacent each end thereof and are, in turn, supported by the four corner posts 45 of the elevator. Disposed longitudinally of the cradle, midway between the tracks 41 thereof and supported also by the cross-members 44 is an automobile transfer rack 46 which is in the form of an I-beam and extends from one end of the cradle to the other. It is the purpose of this rack to transfer vehicles from and to the cradle with respect to a selected parking stall, once the cradle is brought into register therewith. To accomplish this, a bumper stop lug 47 is mounted adjacent each end of the transfer rack and, by virtue of a flanged mounting plate 48, in slidable engagement with the upper surface of the transfer rack, each stop lug 47 is capable of being moved on the rack in the manner to be presently described, thereby accommodating automobiles of different lengths.

To actuate the transfer bar or rack 46, a transverse shaft 49 is supported in bearings affixed on the underside of each cradle track 41 adjacent one end thereof. A pulley 50 (Figs. 5 and 9) is mounted on one end of the shaft 49 and carries a belt 51 which is driven through a second pulley 52 by a motor 53, to operate the shaft 49. A gear 54 (Fig. 8) is mounted on shaft 49 at its midsection and engages the gear rack 55, causing the same to move longitudinally of the elevator cradle.

The transfer bar or rack 46 is held against other than longitudinal displacement in the cradle by cleats 56, welded to the cross-members 44 and overlying the bottom flanges of the bar 46.

In order to park an automobile, the elevator is lowered to the floor, as shown in Figure 2 and turned into a longitudinal position. The vehicle is driven onto the tracks 41 of the cradle, whereupon the bumper lugs 47 are raised from the reclining position shown in dotted lines in Figure 8 to the solid line position thereof, in which position the lugs are supported by brackets 57 and are adapted to engage the bumpers of the vehicle on the cradle and prevent its rolling therefrom.

The motor 36 is started in order to operate the cable drums and wind thereon the cables 33 to raise the elevator. Through the medium of any suitable form of indicator enabling the operator to determine when the desired level is reached by the cradle, the elevator is stopped and motor 31 is energized to revolve the elevator to a position aligning its tracks 41 with those of a selected stall.

When the elevator is positioned as above described, the vehicle on the cradle is moved into a stall by first operating motor 53 to actuate the transfer bar 46, thus to push the vehicle into the stall by the lugs 47. When the vehicle is parked, the lugs are dropped to horizontal position and the bar retracted by reversing the motor 53, after which the elevator is removed.

It is preferred that the tracks 12 of the stalls extend slightly into the alleyway C so that the ends of the elevator cradle tracks 41 may be brought to rest thereon by raising the elevator so that the cradle tracks are slightly above the stall tracks and then lowering the elevator to bring the track ends into juxtaposition.

To remove a car from a stall, the procedure is reversed, that is, the cradle is aligned with the stall and the transfer bar 46 is extended under the vehicle, after which the bumper lugs 47 are raised. The bar is then retracted, the lugs 47 pulling the car onto the cradle tracks 41, after which the elevator is raised slightly, rotated ninety (90) degrees and lowered to the floor level.

To adjust the bumper lugs 47, a screw rod 58 is affixed at 59 at one end to a lug mounting plate 48 and extends above and in parallelism with the transfer bar 46 towards its midsection. The transfer bar 46 is recessed at 60 to accommodate gears 61 of which there is one for each of the two screw rods 58. Each gear 61 is internally threaded to receive a screw rod and bearings 62 on each side of each gear 61 hold these gears against other than rotation, hence rotation of the gears will cause longitudinal movement of the screw rods 58.

The screw rods 58 are actuated by individual motors 63 through belt drives 64 which are effective to operate gears 65, meshing with the gears 61 on the screw rods. It is to be observed however that adjustment of the bumper lugs 47 in the described manner can be effected only while the transfer bar 46 is centered in the elevator, as shown in Figures 5 and 6, otherwise the gears 61 and 65 will be out of meshing relationship.

Manifestly, the construction as shown and described is capable of some modification and such modification as may be construed to fall within the scope and meaning of the appended claims is also considered to be within the spirit and intent of the invention.

What is claimed is:

1. In an elevator for an automobile storage building having opposed tiers of storage stalls defining an intervening alley, a car loading and unloading apparatus for said elevator comprising tracks in said elevator alignable with analogous tracks in selected stalls, a bar disposed for longitudinal movement of said elevator, a hinged bumper stop lug displaceably arranged adjacent each end of the bar adapted to engage a bumper of an automobile on said elevator, a gear rack affixed longitudinally to the underside of said bar, a gear engageable with said gear rack, motor means for driving said gear to move said bar longitudinally in said elevator, a screw rod attached to each of said bumper stop lugs and extending longitudinally of said bar towards its midsection, a peripherally toothed gear having an internal worm rotatable on said screw rod and motor means for operating said gear to shift said bumper stop lug on said bar.

2. In combination with an elevator for automobile storage buildings, a car loading and unloading apparatus comprising parallel car supporting tracks on said elevator, a bar disposed between said tracks, a gear rack on the underside of said bar, a car stop lug pivotally mounted on each end of said bar, right and left hand threaded screw rods, each attached at one end to a car stop lug, a gear engaging the threaded portion of each of said screw rods, means for independently rotating said gears to actuate said screw rods and car stop lugs and means for actuating said gear rack to effect longitudinal displacement of said bar on said elevator.

3. In combination with an elevator for automobile storage buildings, parallel tracks on said elevator for supporting an automobile, an automobile transfer bar between said tracks, a plate slidably attached to said transfer bar adjacent each end thereof, a bumper stop lug hinged to each of said plates, a screw rod attached at one end to each of said plates, said screw rods having right and left hand threads, an internally threaded gear mounted on the threaded section of each of said screw rods, means for rotating said gears to effect movement of said plates longitudinally on said transfer bar and means for moving said transfer bar longitudinally on said elevator.

4. In combination with an automobile storage elevator, an automobile transfer bar mounted for longitudinal displacement on said elevator, an automobile bumper stop lug slidably mounted on said transfer bar adjacent each end thereof, a screw rod attached at one end to each of said stop lugs, said screw rods being parallel with said transfer bar and having oppositely threaded free ends, an internally threaded gear rotatable on the threaded portion of each of said screw rods, means for rotating said gears to move said rods and said stop lugs longitudinally of said transfer bar and means for effecting longitudinal displacement of said transfer bar on said elevator.

GEORGE G. GOODWYN.

References Cited in the file of this patent

UNITED STATES PATENTS

| Number | Name | Date |
|---|---|---|
| 1,363,442 | Swern | Dec. 28, 1920 |
| 1,729,891 | Moore | Oct. 1, 1929 |
| 1,757,331 | Porter | May 6, 1930 |
| 1,869,046 | Buck | July 26, 1932 |
| 1,879,713 | Scott | Sept. 27, 1932 |
| 1,977,785 | Wheelock | Oct. 23, 1934 |
| 2,428,856 | Sinclair | Oct. 14, 1947 |
| 2,493,493 | Mariano | Jan. 3, 1950 |
| 2,553,378 | Miller | May 15, 1951 |